(12) United States Patent
Takaki et al.

(10) Patent No.: US 6,204,327 B1
(45) Date of Patent: Mar. 20, 2001

(54) VINYL CHLORIDE RESIN COMPOSITION

(75) Inventors: Akira Takaki, Kobe; Shinichi Yauchi, Kakogawa; Koji Yui; Riichi Nishimura, both of Akashi; Kentaro Takesada, Takasago, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/147,076

(22) PCT Filed: Mar. 31, 1997

(86) PCT No.: PCT/JP97/01121

§ 371 Date: Apr. 27, 1999

§ 102(e) Date: Apr. 27, 1999

(87) PCT Pub. No.: WO97/36959

PCT Pub. Date: Oct. 9, 1997

(30) Foreign Application Priority Data

Apr. 3, 1996 (JP) ................................... 8-081599

(51) Int. Cl.[7] .................................................. C08L 51/04
(52) U.S. Cl. ................................. 525/71; 525/86
(58) Field of Search ......................... 525/71, 86

(56) References Cited

U.S. PATENT DOCUMENTS 4,275,178 * 6/1981 Yusa et al. ............................. 525/71

FOREIGN PATENT DOCUMENTS

| 0 163 939 A2 | 12/1985 | (EP) . |
| 54-148842 | 11/1979 | (JP) . |
| 59-189143 | 10/1984 | (JP) . |
| 62-101647 | 5/1987 | (JP) . |
| 62-167348 | 7/1987 | (JP) . |
| 5-247313 | 9/1993 | (JP) . |

OTHER PUBLICATIONS

Abstract of Japanese Publication No. 6–116471—Apr. 26, 1994 (Derwent Publications, Ltd.) Class A14, XP002102259.

* cited by examiner

Primary Examiner—James J. Seidleck
Assistant Examiner—Olga Asinovsky
(74) Attorney, Agent, or Firm—Armstrong, Westerman, Hattori, McLeland & Naughton, LLP

(57) ABSTRACT

A vinyl chloride resin composition containing a graft copolymer A having an average particle diameter of at least 0.15 μm, prepared by polymerizing 50 to 90% of a solid matter of a rubber latex having a glass transition temperature of at most 0° C., the rubber latex being prepared by polymerizing 50 to 100% of butadiene and/or alkyl acrylate, 0 to 40% of an aromatic vinyl monomer, 0 to 10% of a vinyl monomer and 0 to 5% of a polyfunctional monomer, with 10 to 50% of a mixture comprising 10 to 100% of an alkyl methacrylate, 0 to 90% of an aromatic vinyl monomer, 0 to 25% of a vinyl cyamide monomer and 0 to 20% of a vinyl monomer; a graft copolymer B having an average particle diameter of 0.05 to 0.13 μm, prepared by polymerizing 50 to 90% of the solid matter of the rubber latex with 10 to 50% of the mixture; and a vinyl chloride resin C; wherein the weight ratio of (copolymer A)/(copolymer B) is 50/50 to 90/15, and the weight ratio of (the total amount of copolymer A and copolymer B)/(vinyl chloride resin composition C) is 1/99 to 30/70; the composition being excellent in impact resistance and usable for the production of a pipe, a window frame and the like.

5 Claims, No Drawings

VINYL CHLORIDE RESIN COMPOSITION

TECHNICAL FIELD

The present invention relates to a vinyl chloride resin composition. More particularly, the present invention relates to a vinyl chloride resin composition having a good balance between falling weight strength as a typical example for evaluation of a ductile destruction and Charpy strength as a typical example for evaluation of a brittle destruction, and an excellent impact resistance, which can be preferably used for the production of a molded material such as a pipe or a window frame by extrusion molding.

BACKGROUND ART

Conventionally, as a reinforcer for improving impact resistance of a vinyl chloride resin, a so-called MBS resin prepared by graft copolymerizing methyl methacrylate, styrene or the like with a butadiene rubber has been developed. In addition to a method of using the MBS resin, various methods for improving impact resistance of the vinyl chloride resin have hitherto been studied.

However, in the utilization field of the vinyl chloride resin, it has been recently required that the vinyl chloride resin has a high impact strength according to various evaluation methods in view of practical strength. As to a pipe made of the vinyl chloride resin, for instance, it has been required for the pipe to be excellent in both falling weight strength capable of coping with destruction caused by stroke in case of conveying and burying in the ground, and Charpy strength capable of coping with destruction easily caused by a notch effect at the flaw part in case that the flaw is formed and an impact occurs.

The present invention has been accomplished in consideration of the above prior art, and aims at providing a vinyl chloride resin composition having a good balance between falling weight strength and Charpy strength, and an excellent impact resistance.

DISCLOSURE OF THE INVENTION

The present invention relates to a vinyl chloride resin composition containing
a graft copolymer (A) having an average particle diameter of at least 0.15 μm, prepared by polymerizing 50 to 90% by weight of a solid matter of a rubber latex (a) having a glass transition temperature of at most 0° C., the rubber latex (a) being prepared by polymerizing 50 to 100% by weight of butadiene and/or alkyl acrylate (a-1), 0 to 40% by weight of an aromatic vinyl monomer (a-2), 0 to 10% by weight of a vinyl monomer (a-3) capable of copolymerizing with the butadiene and/or alkyl acrylate (a-1) and the aromatic vinyl monomer (a-2), and 0 to 5% by weight of a polyfunctional monomer (a-4), with 10 to 50% by weight of a monomer mixture (b) comprising 10 to 100% by weight of an alkyl methacrylate (b-1), 0 to 90% by weight of an aromatic vinyl monomer (b-2), 0 to 25% by weight of a vinyl cyanide monomer (b-3) and 0 to 20% by weight of a vinyl monomer (b-4) capable of copolymerizing with the alkyl methacrylate (b-1), the aromatic vinyl monomer (b-2) and the vinyl cyanide monomer (b-3);
a graft copolymer (B) having an average particle diameter of 0.05 to 0.13 μm, prepared by polymerizing 50 to 90% by weight of a solid matter of a rubber latex (a') having a glass transition temperature of at most 0° C., the rubber latex (a') being prepared by polymerizing 50 to 100% by weight of butadiene and/or alkyl acrylate (a'-2), 0 to 40% by weight of an aromatic vinyl monomer (a'-2), 0 to 10% by weight of a vinyl monomer (a'-3) capable of copolymerizing with the butadiene and/or alkyl acrylate (a'-1) and the aromatic vinyl monomer (a'-2), and 0 to 5% by weight of a polyfunctional monomer (a'-4), with 10 to 50% by weight of a monomer mixture (b') comprising 10 to 100% by weight of an alkyl methacrylate (b'-1), 0 to 90% by weight of an aromatic vinyl monomer (b'-2), 0 to 25% by weight of a vinyl cyanide monomer (b'-3) and 0 to 20% by weight of a vinyl monomer (b'-4) capable of copolymerizing with the alkyl methacrylate (b'-1), the aromatic vinyl monomer (b'-2) and the vinyl cyanide monomer (b'-3); and
a vinyl chloride resin (C);
wherein the proportion of the above graft copolymer (A) to the graft copolymer (B) (graft copolymer (A)/graft copolymer (B) (weight ratio)) is 50/50 to 95/5, and the proportion of the total amount of the above graft copolymer (A) and the graft copolymer (B) to the vinyl chloride resin (C) (total amount of graft copolymer (A) and graft copolymer (B)/vinyl chloride resin (C) (weight ratio)) is 1/99 to 30/70.

BEST MODE FOR CARRYING OUT THE INVENTION

The vinyl chloride resin composition of the present invention contains, as described above, a graft copolymer (A) having an average particle diameter of at least 0.15 μm, prepared by polymerizing 50 to 90% by weight of a solid matter of a rubber latex (a) having a glass transition temperature of at most 0° C., the rubber latex (a) being prepared by polymerizing 50 to 100% by weight of butadiene and/or alkyl acrylate (a-1), 0 to 40% by weight of an aromatic vinyl monomer (a-2), 0 to 10% by weight of a vinyl monomer (a-3) capable of copolymerizing with the butadiene and/or alkyl acrylate (a-1) and the aromatic vinyl monomer (a-2), and 0 to 5% by weight of a polyfunctional monomer (a-4), with 10 to 50% by weight of a monomer mixture (b) comprising 10 to 100% by weight of an alkyl methacrylate (b-1), 0 to 90% by weight of an aromatic vinyl monomer (b-2), 0 to 25% by weight of a vinyl cyanide monomer (b-3) and 0 to 20% by weight of a vinyl monomer (b-4) capable of copolymerizing with the alkyl methacrylate (b-1), the aromatic vinyl monomer (b-2) and the vinyl cyanide monomer (b-3);
a graft copolymer (B) having an average particle diameter of 0.05 to 0.13 μm, prepared by polymerizing 50 to 90% by weight of a solid matter of a rubber latex (a') having a glass transition temperature of at most 0° C., the rubber latex (a') being prepared by polymerizing 50 to 100% by weight of butadiene and/or alkyl acrylate (a'-1), 0 to 40% by weight of an aromatic vinyl monomer (a'-2), 0 to 10% by weight of a vinyl monomer (a'-3) capable of copolymerizing with the butadiene and/or alkyl acrylate (a'-1) and the aromatic vinyl monomer (a'-2), and 0 to 5% by weight of a polyfunctional monomer (a'-4), with 10 to 50% by weight of a monomer mixture (b') comprising 10 to 100% by weight of an alkyl methacrylate (b'-1), 0 to 90% by weight of an aromatic vinyl monomer (b'-2), 0 to 25% by weight of a vinyl cyanide monomer (b'-3) and 0 to 20% by weight of a vinyl monomer (b'-4) capable of copolymerizing with the alkyl methacrylate (b'-1), the aromatic vinyl monomer (b'-2) and the vinyl cyanide monomer (b'-3); and
a vinyl chloride resin (C); wherein the proportion of the above graft copolymer (A) to the graft copolymer (B) (graft copolymer (A)/graft copolymer (B) (weight ratio)) is 50/50 to 95/5, and the proportion of the total amount of the above graft copolymer (A) and the graft copolymer (B) to the vinyl chloride resin (C) (total amount of graft copolymer (A) and graft copolymer (B)/vinyl chloride resin (C) (weight ratio)) is 1/99 to 30/70.

In the present invention, it is one of large characteristics to use two kinds of graft copolymers having specific different average particle diameters, and it is considered that a balance between falling weight strength and Charpy strength can be improved because craze which performs an important function for absorption of energy and shear yield are sufficiently generated.

The graft copolymer (A) used in the present invention is obtained by polymerizing a rubber latex (a) having a glass transition temperature of at most 0° C. with a monomer mixture (b).

The rubber latex (a) is obtained, for instance, by an emulsion polymerization of butadiene and/or alkyl acrylate (a-1) and, if necessary, an aromatic vinyl monomer (a-2), a vinyl monomer (a-3) (hereinafter referred to as "vinyl monomer (a-3)") capable of copolymerizing with the butadiene and/or alkyl acrylate (a-1) and the aromatic vinyl monomer (a-2), and a polyfunctional monomer (a-4).

As the above butadiene, 1,3-butadiene is usually used.

The above alkyl acrylate is a component which does not lower weathering resistance of a molded material finally obtained from the vinyl chloride resin composition of the present invention Typical examples of the above alkyl acrylate are, for instance, alkyl acrylates having an alkyl group of 1 to 5 carbon atoms, such as methyl acrylate, ethyl acrylate and butyl acrylate and the like, and they can be used alone or in an admixture thereof.

The amount of the butadiene and/or alkyl acrylate (a-1) is 50 to 100% by weight based on the total amount of polymerizable components used for the preparation of the rubber latex (a) in order to sufficiently improve impact resistance of the finally obtained molded material.

The above aromatic vinyl monomer (a-2) is a component used for reducing a difference between refractive index of the graft copolymer and refractive index of the vinyl chloride resin (C) as much as possible, and sometimes exhibits an action of improving transparency of the molded material finally obtained from the vinyl chloride resin composition of the present invention.

Typical examples of the above aromatic vinyl monomer (a-2) are, for instance, styrene, a αmethylstyrene and the like, and they can be used alone or in an admixture thereof.

The amount of the aromatic vinyl monomer (a-2) is 0 to 40 % by weight based on the total amount of the polymerizable components used for the preparation of the rubber latex (a) in order to reduce a fear that it becomes difficult to obtain the desired rubber latex (a) because the amount of the above butadiene and/or alkyl acrylate (a-1) is relatively decreased.

The above vinyl monomer (a-3) is a component used for conducting various fine adjustments of the graft copolymer (A) and the vinyl chloride resin (C).

Typical examples of the above vinyl monomer (a-3) are, for instance, vinyl cyanide monomers such as acrylonitrile and methacrylonitrile and the like, and they can be used alone or in an admixture thereof.

The amount of the vinyl monomer (a-3) is 0 to 10% by weight based on the total amount of the polymerizable components used for the preparation of the rubber latex (a) in order to reduce a fear that it becomes difficult to obtain the desired rubber latex (a) because the amount of the above butadiene and/or alkyl acrylate (a-1) is relatively decreased.

The above polyfunctional monomer (a-4) is a component used for forming a crosslinked structure in the resulting rubber latex (a).

Typical examples of the above polyfunctional monomer (a-4) are, for instance, divinylbenzene, allyl acrylate, allyl methacrylate and the like, and they can be used alone or in an admixture thereof.

The amount of the polyfunctional monomer (a-4) is 0 to 5% by weight based on the total amount of the polymerizable components used for the preparation of the rubber latex (a) in order to reduce a fear that it becomes difficult to obtain the desired rubber latex (a) because the amount of the above butadiene and/or alkyl acrylate (a-1) is relatively decreased.

A method for preparaing the rubber latex (a) is not particularly limited. For instance, there can be employed a method of adding a polymerization initiator, an emulsifier and the like to the polymerizable components containing the above butadiene and/or alkyl acrylate (a-1), the aromatic vinyl monomer (a-2), the vinyl monomer (a-3) and the polyfunctional monomer (a-4) in the desired amount, respectively, and polymerizing the mixture by a usual emulsion polymerization method; and the like.

The glass transition temperature of the rubber of the thus obtained rubber latex (a) is at most 0° C., preferably at most −30° C. so that the finally obtained molded material can be sufficiently deformed even in the case that a large deformation rate is applied thereto.

The above monomer mixture (b) comprises an alkyl methacrylate (b-1) and, if necessary, an aromatic vinyl monomer (b-2), a vinyl cyanide monomer (b-3) and a vinyl monomer (b-4) (hereinafter referred to as "vinyl monomer (b-4)") capable of copolymerizing with the alkyl methacrylate (b-1), the aromatic vinyl monomer (b-2) and the vinyl cyanide monomer (b-3).

The above alkyl methacrylate (b-1) is a component used for improving adhesion property between the graft copolymer and the vinyl chloride resin (C), thereby improving impact strength of the molded material finally obtained from the vinyl chloride resin composition of the present invention.

Typical examples of the above alkyl methacrylate (b-1) are, for instance, alkyl methacrylates having an alkyl group of 1 to 5 carbon atoms, such as methyl methacrylate, ethyl methacrylate and butyl methacrylate and the like, and they can be used alone or in an admixture thereof.

The amount of the alkyl methacrylate (b-1) is 10 to 100% by weight based on the total amount of the monomer mixture (b) in order to sufficiently improve impact strength of the finally obtained molded material.

The above aromatic vinyl monomer (b-2) is a component used for reducing a difference between refractive index of the graft copolymer and refractive index of the vinyl chloride resin (C) as much as possible, and sometimes exhibits an action of improving transparency of the molded material finally obtained from the vinyl chloride resin composition of the present invention.

Typical examples of the above aromatic vinyl monomer (b-2) are, for instance, monomers described as typical examples of the above aromatic vinyl monomer (a-2) and the like, and they can be used alone or in an admixture thereof.

The amount of the aromatic vinyl monomer (b-2) is 0 to 90% by weight based on the total amount of the monomer mixture (b) in order to reduce a fear that it becomes difficult to sufficiently improve impact strength of the finally obtained molded material because the amount of the above alkyl methacrylate (b-1) is relatively decreased.

The above vinyl cyanide monomer (b-3) is a component used for conducting various fine adjustments of the graft copolymer (A) and the vinyl chloride resin (C).

Typical examples of the above vinyl cyanide monomer (b-3) are, for instance, acrylonitrile, methacrylonitrile and the like, and they can be used alone or in an admixture thereof.

The amount of the vinyl cyanide monomer (b-3) is 0 to 25 % by weight based on the total amount of the monomer mixture (b) in order to reduce a fear that it becomes difficult to sufficiently improve impact strength of the finally obtained molded material because the amount of the above alkyl methacrylate (b-1) is relatively decreased.

The above vinyl monomer (b-4) is a component used for adjusting the processability at the time of molding the vinyl chloride resin composition.

Typical examples of the above vinyl monomer (b-4) are, for instance, alkyl acrylates having an alkyl group of 1 to 5 carbon atoms, such as methyl acrylate, ethyl acrylate, propyl acrylate and butyl acrylate and the like, and they can be used alone or in an admixture thereof.

The amount of the vinyl monomer (b-4) is 0 to 20% by weight based on the total amount of the monomer mixture (b) in order to reduce a fear that it becomes difficult to sufficiently improve impact strength of the finally obtained molded material because the amount of the above alkyl methacrylate (b-1) is relatively decreased.

The graft copolymer (A) used in the present invention is obtained by graft copolymerizing the above rubber latex (a) with the monomer mixture (b).

With respect to the amount of the above rubber latex (a) and the monomer mixture (b), the amount of the solid matter of the rubber latex (a) is adjusted to at least 50% by weight, preferably at least 60% by weight, that is, the amount of the monomer mixture (b) is adjusted to at most 50% by weight, preferably at most 40% by weight, in order to sufficiently improve impact strength of the molded material finally obtained from the vinyl chloride resin composition of the present invention. Furthermore, in order to reduce a fear that it becomes difficult to obtain a good powdery resin composition because the graft copolymer (A) is converted into a bulk material at the time of solidifying, the amount of the solid matter of the rubber latex (a) is adjusted to at most 90% by weight, preferably at most 80% by weight, that is, the amount of the monomer mixture (b) is adjusted to at least 10% by weight, preferably at least 20% by weight.

A method for preparing the above graft copolymer (A) is not particularly limited. For instance, there can be employed a method of adding the monomer mixture (b) containing the alkyl methacrylate (b-1), the aromatic vinyl monomer (b-2), the vinyl cyanide monomer (b-3) and the vinyl monomer (b-4) in the desired amount, respectively, to the rubber latex (a) having a glass transition temperature of at most 0° C., prepared as described above, adding a polymerization initiator and the like thereto, and polymerizing the mixture by a usual polymerization method to give a powdery graft copolymer from a graft copolymer latex; and the like.

The addition and polymerization of the above monomer mixture (b) may be conducted in one step or several steps, and there are no limitations.

The average particle diameter of the thus obtained graft copolymer (A) in the emulsified state after the completion of the polymerization is at least 0.15 $\mu$m, preferably at least 0.2 $\mu$m in order to sufficiently generate a craze which exhibits an important function for Charpy strength. The average particle diameter is preferably at most 0.4 $\mu$m in consideration of taking the time required to synthesize the graft copolymer (A).

In order to obtain the graft copolymer (A) having an average particle diameter of at least 0.15 $\mu$m, for instance, the rubber latex (a) previously having an average particle diameter of at least 0.15 $\mu$m may be used, and the rubber latex (a) having an average particle diameter of at most 0.1 $\mu$m or so may be allowed to grow by an acid or a salt, and there are no limitations.

The graft copolymer (B) used in the present invention is obtained by graft copolymerizing a rubber latex (a') having a glass transition temperature of at most 0° C. with a monomer mixture (b').

As the above rubber latex (a'), there can be used those obtained by adding a polymerization initiator, an emulsifier and the like to polymerizable components containing butadiene and/or alkyl acrylate (a'-1) and, if necessary, an aromatic vinyl monomer (a'-2), a vinyl monomer (a'-3) (hereinafter referred to as "vinyl monomer (a-'3)") capable of copolymerizing with the butadiene and/or alkyl acrylate (a'-1) and the aromatic vinyl monomer (a'-2), and a polyfunctional monomer (a-'4) in the desired amount, respectively, and polymerizing the mixture by a usual emulsion polymerization method, in the same manner as the preparation of the above graft copolymer (A).

Typical examples of the above butadiene and/or alkyl acrylate (a-'1), the aromatic vinyl monomer (a-'2), the vinyl monomer (a'-3) and the polyfunctional monomer (a'-4) are the same as those of the butadiene and/or alkyl acrylate (a-1), the aromatic vinyl monomer (a-2), the vinyl monomer (a-3) and the polyfunctional monomer (a-4), respectively, which are used for the preparation of the graft copolymer (A). The range of the amount of each component is the same as that in the case of synthesizing he graft copolymer (A).

The glass transition temperature of the rubber of the thus obtained rubber latex (a') is at most 0° C., preferably at most −30° C. so that the finally obtained molded material can be sufficiently deformed even in the case that a large deformation rate is applied thereto.

The above monomer mixture (b') comprises an alkyl methacrylate (b-'1) and, if necessary, an aromatic vinyl monomer (b'-2), a vinyl cyanide monomer (b'-3) and a vinyl monomer (b'-4) (hereinafter referred to as "vinyl monomer (b'-4)") capable of copolymerizing with the alkyl methacrylate (b'-1), the aromatic vinyl monomer (b'-2) and the vinyl cyanide monomer (b'-3).

Typical examples of the above alkyl methacrylate (b'-1), the aromatic vinyl monomer (b'-2), the vinyl cyanide monomer (b'-3) and the vinyl monomer (b'-4) are the same as those of the alkyl methacrylate (b-1), the aromatic vinyl monomer (b-2), the vinyl cyanide monomer (b-3) and the vinyl monomer (b-4), respectively, which are used for the preparation of the graft copolymer (A). The range of the amount of each component is the same as that in the case of synthesizing the graft copolymer (A).

With respect to the amount of the above rubber latex (a') and the monomer mixture (b'), as the same in the preparation of the above graft copolymer (A), the amount of the solid matter of the rubber latex (a') is adjusted to at least 50% by weight, preferably at least 60% by weight, that is, the amount of the monomer mixture (b') is adjusted to at most 50% by weight, preferably at most 40 % by weight, in order to sufficiently improve impact strength of the molded material finally obtained from the vinyl chloride resin composition of the present invention. Furthermore, in order to reduce a fear that it becomes difficult to obtain a good powdery resin composition because the graft copolymer (B) is converted into a bulk material at the time of solidifying, the amount of the solid matter of the rubber latex (a') is adjusted to at most 90% by weight, preferably at most 80 % by weight, that is, the amount of the monomer mixture (b') is adjusted to at least 10 % by weight, preferably at least 20% by weight.

A method for preparing the graft copolymer (B) is not particularly limited. For instance, as the same in the preparation of the above graft copolymer (A), there can be employed a method of adding the monomer mixture (b') to the rubber latex (a') having a glass transition temperature of at most 0° C., prepared as described above, adding a polymerization initiator and the like thereto, and polymerizing the mixture by a usual polymerization method to give a powdery graft copolymer from a graft copolymer latex; and the like.

The addition and polymerization of the above monomer mixture (b') may be conducted in one step or several steps, and there are no limitations.

The average particle diameter of the thus obtained graft copolymer (B) in the emulsified state after the completion of the polymerization is at least 0.05 $\mu$m, preferably at least 0.07 $\mu$m so as to produce it stably.

In order to maintain a small distance between graft copolymer particles, which makes it easy to generate a shear yield which is important for falling weight strength, the average particle diameter is at most 0.13 $\mu$m, preferably at most 0.1 $\mu$m.

In order to obtain the graft copolymer (B) having an average particle diameter of 0.05 to 0.13 $\mu$m, for instance, the rubber latex (a') previously having an average particle diameter of 0.05 to 0.13 $\mu$m or so may be used, and the particle diameter may be adjusted with an acid or a salt, and there are no limitations.

Examples of the vinyl chloride resin (C) used in the present invention are, for instance, a vinyl chloride copolymer prepared by copolymerizing vinyl chloride with a vinyl monomer such as vinyl acetate or ethylene, wherein a content of vinyl chloride is at least 80% by weight, and post chlorinated polyvinyl chloride, in addition to vinyl chloride resin.

The average polymerization degree of the above vinyl chloride resin (C) is preferably 600 to 1500 or so in consideration of a processability at the time of molding.

The vinyl chloride resin composition of the present invention contains the graft copolymer (A), the graft copolymer (B) and the vinyl chloride resin (C).

The proportion of the above graft copolymer (A) to the graft copolymer (B) (graft copolymer (A)/graft copolymer (B) (weight ratio)) is at least 50/50, preferably at least 70/30, and is at most 95/5, preferably at most 90/10, in order to impart falling weight strength as a typical example for evaluation of a ductile destruction and Charpy strength as a typical example for evaluation of a brittle destruction to the resulting vinyl chloride resin composition in well-balanced state.

The proportion of the total amount of the above graft copolymer (A) and the graft copolymer (B) to the vinyl chloride resin (C) (total amount of graft copolymer (A) and graft copolymer (B)/vinyl chloride resin (C) (weight ratio)) is at least 1/99, preferably at least 3/97, and is at most 30/70, preferably at most 10/90, in order to sufficiently improve impact strength of the resulting vinyl chloride resin composition It is possible to add additives such as a stabilizer, a lubricant, an extender such as calcium carbonate and a pigments such as carbon black into the vinyl chloride resin composition of the present invention after appropriately adjusting the amount thereof, in addition to the graft copolymer (A), the graft copolymer (B) and the vinyl chloride resin (C).

A method for preparing the vinyl chloride resin composition of the present invention is not particularly limited. For instance, there can be employed a method of mixing the graft copolymer (A), the graft copolymer (B) and the vinyl chloride resin (C) and, if necessary, other additives, of which the amount is appropriately adjusted within the above range, respectively, with heating to 90° to 140° C. or so using a blender, and then, cooling them; and the like.

In the present invention, the graft copolymer (A) and the graft copolymer (B) may be previously mixed together with to give a mixed resin. In order to obtain the mixed resin, the graft copolymer (A) and the graft copolymer (B) may be respectively solidified with an acid or a salt, thermally treated, dehydrated and dried, and then, both components may be mixed together with. Also, the graft copolymer (A) and the graft copolymer (B) may be mixed in the state of latexes, and then, the mixture may be thermally treated, dehydrated and dried.

The thus obtained vinyl chloride resin composition of the present invention has a good balance between falling weight strength and Charpy strength, and is excellent in impact resistance. Therefore, the vinyl chloride resin composition can be preferably used for the production of, for instance, a molded material such as a pipe or a window frame by, for instance, a usual extrusion molding.

The vinyl chloride resin composition of the present invention is more specifically explained on the basis of the Examples, however, the present invention is not limited to only the Examples.

EXAMPLE 1

A pressure polymerization vessel equipped with a stirrer was charged with 200 parts (parts by weight, hereinafter referred to as same) of water, 1.5 parts of sodium oleate, 0.002 part of ferrous sulfate ($FeSO_4 \cdot 7H_2O$), 0.005 part of disodium salt of ethylenediamine tetraacetate (hereinafter referred to as "EDTA"), 0.2 part of sodium formaldehydesulfoxylate, 0.2 part of tripotassium phosphate, 100 parts of butadiene, 0.5 part of divinylbenzene and 0.1 part of diisopropylbenzene hydroperoxide, and they were polymerized at 50° C. for 15 hours to give a diene rubber latex (R-1) having a polymerization conversion rate of 99%, an average particle diameter of 0.08 $\mu$m and a glass transition temperature of –90° C.

Then, a pressure polymerization vessel equipped with a stirrer was charged with 7 parts (solid matter content) of the above diene rubber latex (R-1), 200 parts of water, 0.0017 part of ferrous sulfate ($FeSO_4 \cdot 7H_2O$), 0.004 part of disodium salt of EDTA, 0.17 part of sodium formaldehydesulfoxylate, 0.17 part of tripotassium phosphate, 93 parts of butadiene, 0.45 part of divinylbenzene and 0.085 part of diisopropylbenzene hydroperoxide, and they were polymerized at 50° C. After the lapse of 6 hours, 12 hours, 18 hours and 24 hours from the beginning of the polymerization, 0.3 part of sodium oleate was added thereto, respectively, to give a diene rubber latex (R-2) having a polymerization conversion rate of 99%, an average particle diameter of 0.21 $\mu$m and a glass transition temperature of –90°C. after the lapse of 30 hours.

After 210 parts (solid matter content: 70 parts) of the above diene rubber latex (R-2), 200 parts of water, 0.002 part of ferrous sulfate ($FeSO_{4.} 7H_2 O$), 0.004 part of disodium salt of EDTA and 0.1 part of sodium formaldehydesulfoxylate were mixed together with, an inner temperature of the mixture was set to 70° C. by heating. Then, a mixed solution of 27 parts of methyl methacrylate, 3 parts of styrene and 0.1 part of cumene hydroperoxide was continuously added thereto over 4 hours, and they were post polymerized for 1 hour to give a graft copolymer latex (A-1) having an average particle diameter of 0.23 $\mu$m.

The obtained graft copolymer latex (A-1) was solidified with sulfuric acid, thermally treated, dehydrated and dried to give a powdery graft copolymer (A-1).

On the other hand, after 210 parts (solid matter content: 70 parts) of the diene rubber latex (R-1), 200 parts of water, 0.002 part of ferrous sulfate (FeSO$_4$·7H$_2$O), 0.004 part of disodium salt of EDTA and 0.1 part of sodium formaldehydesulfoxylate were mixed together with, an inner temperature of the mixture was set to 70° C. by heating. Then, a mixed solution of 27 parts of methyl methacrylate, 3 parts of styrene and 0.1 part of cumene hydroperoxide was continuously added thereto over 4 hours, and they were post polymerized for 1 hour to give a graft copolymer latex (B-1) having an average particle diameter of 0.09 µm.

The obtained graft copolymer latex (B-1) was solidified with sulfuric acid, thermally treated, dehydrated and dried to give a powdery graft copolymer (B-1).

After 6 parts of a mixed resin of 90% by weight of the powdery graft copolymer (A-1) and 10% by weight of the powdery graft copolymer (B-1), 1.5 parts of octyltin mercaptide (stabilizer), 100 parts of vinyl chloride resin (average polymerization degree: 1300) and 3 parts of paraffin 155 (lubricant) were introduced into a blender and they were mixed with heating to 130° C., they were cooled to room temperature to give a vinyl chloride resin composition.

The obtained vinyl chloride resin composition was extruded under the following molding conditions (preset temperature) using an extrusion molder (conical molder TEC-55DV, made by TOSHIBA MACHINE CO., LTD.) to produce a pipe having an inner diameter of 1 inch (about 2.54 cm) and a wall thickness of about 3 mm

| [Molding conditions (preset temperature)] | | |
|---|---|---|
| (Cylinder) | C1: | 180° C. |
|  | C2: | 195° C. |
|  | C3: | 195° C. |
|  | C4: | 195° C. |
| (Adapter) |  | 180° C. |
| (Dice) | D1: | 185° C. |
|  | D2: | 190° C. |
|  | D3: | 195° C. |
|  | D4: | 200° C. |
| (Screw) |  | 110° C. |

Then, as physical properties of the obtained pipe, falling weight strength and Charpy strength were examined according to the following methods. The results are shown in Table 1.

(i) Falling weight strength

Using a falling weight of 20 kg, this falling weight was allowed to fall plumb down on the pipe at 0° C. and a mean failure height H$_{50}$ (cm) was measured.

(ii) Charpy strength

A Charpy strength (kg. cm/cm$^2$) was measured according to the method described in JIS (Japanese Industrial Standard) K7111.

EXAMPLE 2

In Example 1, a vinyl chloride resin composition was prepared in the same manner as in Example 1 except that 6 parts of a mixed resin of 70% by weight of the powdery graft copolymer (A-1) and 30% by weight of the powdery graft copolymer (B-1) was used instead of 6 parts of the mixed resin of 90% by weight of the powdery graft copolymer (A-1) and 10% by weight of the powdery graft copolymer (B-1).

A pipe was produced from the obtained vinyl chloride resin composition and physical properties of the pipe were examined in the same manner as in Example 1. The results are shown in Table 1.

EXAMPLE 3

After 90% by weight (solid matter) of the graft copolymer latex (A-1) (graft copolymer (A)) and 10% by weight (solid matter) of the graft copolymer latex (B-1) (graft copolymer (B)), which were prepared in the same manner as in Example 1, were mixed together with, the mixture was solidified with sulfuric acid, thermally treated, dehydrated and dried to give a powdery graft copolymer.

Then, in Example 1, a vinyl chloride resin composition was prepared in the same manner as in Example 1 except that 6 parts of the above powdery graft copolymer was used instead of 6 parts of the mixed resin of 90% by weight of the powdery graft copolymer (A-1) and 10% by weight of the powdery graft copolymer (B-1).

A pipe was produced from the obtained vinyl chloride resin composition and physical properties of the pipe were examined in the same manner as in Example 1. The results are shown in Table 1.

Comparative Example 1

In Example 1, a vinyl chloride resin composition was prepared in the same manner as in Example 1 except that 6 parts of the only powdery graft copolymer (B-1) was used instead of 6 parts of the mixed resin of 90% by weight of the powdery graft copolymer (A-1) and 10% by weight of the powdery graft copolymer (B-1).

A pipe was produced from the obtained vinyl chloride resin composition and physical properties of the pipe were examined in the same manner as in Example 1. The results are shown in Table 1.

Comparative Example 2

In Example 1, a vinyl chloride resin composition was prepared in the same manner as in Example 1 except that 6 parts of the only powdery graft copolymer (A-1) was used instead of 6 parts of the mixed resin of 90% by weight of the powdery graft copolymer (A-1) and 10% by weight of the powdery graft copolymer (B-1).

A pipe was produced from the obtained vinyl chloride resin composition and physical properties of the pipe were examined in the same manner as in Example 1. The results are shown in Table 1.

Comparative Example 3

A pressure polymerization vessel equipped with a stirrer was charged with 29 parts (solid matter content) of the diene rubber latex (R-2) obtained in the same manner as in Example 1, 200 parts of water, 0.0014 part of ferrous sulfate (FeSO$_4$·7H$_2$O), 0.004 part of disodium salt of EDTA, 0.14 part of sodium formaldehydesulfoxylate, 0.14 part of tripotassium phosphate, 71 parts of butadiene, 0.35 part of divinylbenzene and 0.07 part of diisopropylbenzene hydroperoxide, and they were polymerized at 50° C. After the lapse of 6 hours, 12 hours, 18 hours and 24 hours from the beginning of the polymerization, 0.3 part of sodium oleate was added thereto, respectively, to give a diene rubber latex (R-3) having a polymerization conversion rate of 99% and an average particle diameter of 0.32 µm after the lapse of 30 hours.

After 70 parts (solid matter content) of the above diene rubber latex (R-3), 200 parts of water, 0.002 part of ferrous sulfate (FeSO$_4$·7 H$_2$O), 0.004 part of disodium salt of EDTA and 0.1 part of sodium formaldehydesulfoxylate were mixed together with, an inner temperature of the mixture was set to 70° C. by heating. Then, a mixed solution of 27 parts of methyl methacrylate, 3 parts of styrene and 0.1 part of cumene hydroperoxide was continuously added thereto over 4 hours, and they were post polymerized for 1 hour to give a graft copolymer latex (A-2) having an average particle diameter of 0.35 μm.

The obtained graft copolymer latex (A-2) was solidified with sulfuric acid, thermally treated, dehydrated and dried to give a powdery graft copolymer (A-2).

Then, in Example 1, a vinyl chloride resin composition was prepared in the same manner as in Example 1 except that 6 parts of the powdery graft copolymer (A-2) was used instead of 6 parts of the mixed resin of 90% by weight of the powdery graft copolymer (A-1) and 10% by weight of the powdery graft copolymer (B-1).

A pipe was produced from the obtained vinyl chloride resin composition and physical properties of the pipe were examined in the same manner as in Example 1.

The results are shown in Table 1.

Comparative Example 4

In Example 1, a vinyl chloride resin composition was prepared in the same manner as in Example 1 except that 6 parts of a mixed resin of 40% by weight of the powdery graft copolymer (A-1) and 60% by weight of the powdery graft copolymer (B-1) was used instead of 6 parts of the mixed resin of 90% by weight of the powdery graft copolymer (A-1) and 10% by weight of the powdery graft copolymer (B-1).

A pipe was produced from the obtained vinyl chloride resin composition and physical properties of the pipe were examined in the same manner as in Example 1. The results are shown in Table 1.

Comparative Example 5

After 7 parts (solid matter content) of the diene rubber latex (R-1), 63 prats (solid matter content) of the diene rubber latex (R-2), which were prepared in the same manner as in Example 1, 200 parts of water, 0.002 part of ferrous sulfate (FeSO$_4$·7H$_2$O), 0.004 part of disodium salt of EDTA and 0.1 part of sodium formaldehydesulfoxylate were mixed together with, an inner temperature of the mixture was set to 70° C. by heating. Then, a mixed solution of 27 parts of methyl methacrylate, 3 parts of styrene and 0.1 part of cumene hydroperoxide was continuously added thereto over 4 hours, and they were post polymerized for 1 hour to give a graft copolymer latex (A-3) having an average particle diameter of 0.23 μm.

The obtained graft copolymer latex (A-3) was solidified with sulfuric acid, thermally treated, dehydrated and dried to give a powdery graft copolymer (A-3).

Then, in Example 1, a vinyl chloride resin composition was prepared in the same manner as in Example 1 except that 6 parts of the powdery graft copolymer (A-3) was used instead of 6 parts of the mixed resin of 90% by weight of the powdery graft copolymer (A-1) and 10% by weight of the powdery graft copolymer (B-1).

A pipe was produced from the obtained vinyl chloride resin composition and physical properties of the pipe were examined in the same manner as in Example 1. The results are shown in Table 1.

In Table 1, the solid matter content (% by weight) of the rubber latex (a) in the graft copolymer (A), the solid matter content (% by weight) of the rubber latex (a') in the graft copolymer (B), the average particle diameter of the graft copolymer (A) and the graft copolymer (B) in the emulsified state after the completion of the polymerization, the mixing method ("powder mixing" indicates the mixing of powdery copolymers, and "latex mixing" indicates the mixing of copolymer latexes), and the proportion (graft copolymer (A)/graft copolymer (B) (weight ratio)) are shown.

TABLE 1

| | Graft copolymer (A) | | Graft copolymer (B) | | | | Physical properties of pipe | |
|---|---|---|---|---|---|---|---|---|
| | Solid matter content of rubber latex (a) (% by weight) | Average particle diameter (μm) | Solid matter content of rubber latex (a') (% by weight) | Average particle diameter (μm) | Mixing method | Graft copolymer (A)/ Graft copolymer (B) (weight ratio) | Falling weight strength H$_{50}$ (cm) | Charpy strength (kg·cm/cm$^2$) |
| Ex. No. | | | | | | | | |
| 1 | 70 | 0.23 | 70 | 0.09 | Powder mixing | 90/10 | 300 | 110 |
| 2 | 70 | 0.23 | 70 | 0.09 | Powder mixing | 70/30 | 350 | 100 |
| 3 | 70 | 0.23 | 70 | 0.09 | Latex mixing | 90/10 | 310 | 110 |
| Com. Ex. | | | | | | | | |
| 1 | — | — | 70 | 0.09 | — | — | 300 | 30 |
| 2 | 70 | 0.23 | — | — | — | — | 200 | 70 |
| 3 | 70 | 0.35 | — | — | — | — | 150 | 80 |
| 4 | 70 | 0.23 | 70 | 0.09 | Powder mixing | 40/60 | 300 | 40 |
| 5 | 70 | 0.23 | — | — | — | — | 290 | 90 |

From the results shown in Table 1, it can be understood that every pipe produced by molding the vinyl chloride resin compositions of the present invention obtained in Examples 1 to 3 has a falling weight strength of at least 300 cm and a Charpy strength of at least 100 kg- cm/cm$^2$, and has a good balance of both strength, compared to the pipes obtained in Comparative Examples 1 to 5.

EXAMPLE 4

A polymerizer equipped with a stirrer was charged with 250 parts of water, 0.04 part of sodium oleate, 0.002 part of ferrous sulfate (FeSO$_4$·7H$_2$O), 0.008 part of disodium salt of EDTA and 0.2 part of sodium formaldehydesulfoxylate, and they were heated to 50° C. Thereto was added 10% by weight of a mixed solution of 100 parts of butyl acrylate, 1 part of allyl methacrylate and 0.2 part of cumene hydroperoxide. After the lapse of 1 hour, 90% by weight of the remaining mixed solution was added thereto over 5 hours, and they were post polymerized for 1 hour to give an acrylate rubber latex (R-4) having a polymerization conversion rate of 99%, an average particle diameter of 0.18 µm and a glass transition temperature of −40° C.

Then, a polymerizer equipped with a stirrer was charged with 240 parts (solid matter content: 80 parts) of the above acrylate rubber latex (R-4), 200 parts of water, 0.002 part of ferrous sulfate (FeSO$_4$·7H$_2$O), 0.004 part of disodium salt of EDTA and 0.1 part of sodium formaldehydesulfoxylate, and they were heated to 70° C. Thereto was added a mixed solution of 18 parts of methyl methacrylate, 2 parts of butyl acrylate and 0.1 part of cumene hydroperoxide over 3 hours, and they were post polymerized for 1 hour to give a graft copolymer latex (A-4) having an average particle diameter of 0.20 µm.

The obtained graft copolymer latex (A-4) was solidified with calcium chloride, thermally treated, dehydrated and dried to give a powdery graft copolymer (A-4), On the other hand, in the synthesis of the acrylate rubber latex (R-4), an acrylate rubber latex (R-5) having an average particle diameter of 0.08 µm was obtained in the same manner as in the synthesis of the acrylate rubber latex (R-4) except that the amount of sodium oleate to be charged first was changed to 1 part.

Then, in the synthesis of the graft copolymer latex (A-4), a graft copolymer latex (B-2) having an average particle diameter of 0.09 µm was obtained in the same manner as in the synthesis of the graft copolymer latex (A-4) except that the above acrylate rubber latex (R-5) was used instead of the acrylate rubber latex (R-4).

The obtained graft copolymer latex (B-2) was solidified with calcium chloride, thermally treated, dehydrated and dried to give a powdery graft copolymer (B-2).

Then, in Example 1, a vinyl chloride resin composition was prepared in the same manner as in Example 1 except that 6 parts of a mixed resin of 80% by weight of the powdery graft copolymer (A-4) and 20% by weight of the powdery graft copolymer (B-2) was used instead of 6 parts of the mixed resin of 90% by weight of the powdery graft copolymer (A-1) and 10% by weight of the powdery graft copolymer (B-1).

A pipe was produced from the obtained vinyl chloride resin composition and physical properties of the pipe were examined in the same manner as in Example 1.The results are shown in Table 2.

EXAMPLE 5

After 80% by weight (solid matter) of the graft copolymer latex (A-4) and 20% by weight (solid matter) of the graft copolymer latex (B-2), which were prepared in the same manner as in Example 4, were mixed together with, the mixture was solidified with calcium chloride, thermally treated, dehydrated and dried to give a powdery graft copolymer.

Then, in Example 1, a vinyl chloride resin composition was prepared in the same manner as in Example 1 except that 6 parts of the above powdery graft copolymer was used instead of 6 parts of the mixed resin of 90% by weight of the powdery graft copolymer (A-1) and 10% by weight of the powdery graft copolymer (B-1).

A pipe was produced from the obtained vinyl chloride resin composition and physical properties of the pipe were examined in the same manner as in Example 1. The results are shown in Table 2.

Comparative Example 6

In Example 1, a vinyl chloride resin composition was prepared in the same manner as in Example 1 except that 6 parts of the only powdery graft copolymer (B-2) was used instead of 6 parts of the mixed resin of 90% by weight of the powdery graft copolymer (A-1) and 10% by weight of the powdery graft copolymer (B-1).

A pipe was produced from the obtained vinyl chloride resin composition and physical properties of the pipe were examined in the same manner as in Example 1. The results are shown in Table 2.

Comparative Example 7

In the synthesis of the acrylate rubber latex (R-4) in Example 4, an acrylate rubber latex (R-6) having an average particle diameter of 0.15 µm was obtained in the same manner as in the synthesis of the acrylate rubber latex (R-4) except that the amount of sodium oleate to be charged first was changed to 0.1 part.

Then, in the synthesis of the graft copolymer latex (A-4), a graft copolymer latex (A-5) having an average particle diameter of 0.16 µm was obtained in the same manner as in the synthesis of the graft copolymer latex (A-4) except that the above acrylate rubber latex (R-6) was used instead of the acrylate rubber latex (R-4).

The obtained graft copolymer latex (A-5) was solidified with calcium chloride, thermally treated, dehydrated and dried to give a powdery graft copolymer (A-5).

Then, in Example 1, a vinyl chloride resin composition was prepared in the same manner as in Example 1 except that 6 parts of the only powdery graft copolymer (A-5) was used instead of 6 parts of the mixed resin of 90% by weight of the powdery graft copolymer (A-1) and 10% by weight of the powdery graft copolymer (B-1).

A pipe was produced from the obtained vinyl chloride resin composition and physical properties of the pipe were examined in the same manner as in Example 1.The results are shown in Table 2.

Comparative Example 8

In Example 1, a vinyl chloride resin composition was repared in the same manner as in Example 1 except that 6 parts of the only powdery graft copolymer (A-4) was used instead of 6 parts of the mixed resin of 90% by weight of the powdery graft copolymer (A-1) and 10% by weight of the powdery graft copolymer (B-1).

A pipe was produced from the obtained vinyl chloride resin composition and physical properties of the pipe were examined in the same manner as in Example 1.The results are shown in Table 2.

In Table 2, the solid matter content (% by weight) of the rubber latex (a) in the graft copolymer (A), the solid matter content (% by weight) of the rubber latex (a') in the graft copolymer (B), the average particle diameter of the graft copolymer (A) and the graft copolymer (B) in the emulsified state after the completion of the polymerization, the mixing method ("powder mixing" indicates the mixing of powdery copolymers, and "latex mixing" indicates the mixing of copolymer latexes), and the proportion (graft copolymer (A)/graft copolymer (B) (weight ratio)) are shown

TABLE 2

| | Graft copolymer | | | | | | | |
|---|---|---|---|---|---|---|---|---|
| | Graft copolymer (A) | | Graft copolymer (B) | | | | Physical properties of pipe | |
| | Solid matter | Average | Solid matter | Average | | | | |
| | content of rubber latex (a) (% by weight) | particle diameter ($\mu$m) | content of rubber latex (a') (% by weight) | particle diameter ($\mu$m) | Mixing method | Graft copolymer (A)/ Graft copolymer (B) (weight ratio) | Falling weight strength $H_{50}$ (cm) | Charpy strength (kg · cm/cm$^2$) |
| Ex. No. | | | | | | | | |
| 4 | 80 | 0.20 | 80 | 0.09 | Powder mixing | 80/20 | 200 | 80 |
| 5 | 80 | 0.20 | 80 | 0.09 | Latex mixing | 80/20 | 220 | 80 |
| Com. Ex. | | | | | | | | |
| 6 | — | — | 80 | 0.09 | — | — | 200 | 20 |
| 7 | 80 | 0.16 | — | — | — | — | 210 | 40 |
| 8 | 80 | 0.20 | — | — | — | — | 180 | 50 |

From the results shown in Table 2, it can be understood that every pipe produced by molding the vinyl chloride resin compositions of the present invention obtained in Examples 4 to 5 has a falling weight strength of at least 200 cm and a Charpy strength of at least 80 kg.cm/cm$^2$, and has a good balance of both strength, compared to the pipes obtained in Comparative Examples 6 to 8.

INDUSTRIAL APPLICABILITY

The vinyl chloride resin composition of the present invention has a good balance between falling weight strength as a typical example for evaluation of a ductile destruction and charpy strength as a typical example for evaluation of a brittle destruction, and an excellent impact resistance, and the composition can be preferably used for the production of a molded material such as a pipe or a window frame by extrusion molding.

What is claimed is:

1. A vinyl chloride resin composition containing
   a graft copolymer (A) having an average particle diameter of at least 0.15 $\mu$m, prepared by polymerizing 50 to 90% by weight of a solid matter of a rubber latex (a) having a glass transition temperature of at most 0° C., the rubber latex (a) being prepared by polymerizing 50 to 100% by weight of butadiene and/or alkyl acrylate (a-1), 0 to 40% by weight of an aromatic vinyl monomer (a-2), 0 to 10% by weight of a vinyl monomer (a-3) capable of copolymerizing with the butadiene and/or alkyl acrylate (a-1) and the aromatic vinyl monomer (a-2), and 0 to 5% by weight of a polyfunctional monomer (a-4), with 10 to 50% by weight of a monomer mixture (b) comprising 10 to 100% by weight of an alkyl methacrylate (b-1), 0 to 90% by weight of an aromatic vinyl monomer (b-2), 0 to 25% by weight of a vinyl cyanide monomer (b-3) and 0 to 20% by weight of a vinyl monomer (b-4) capable of copolymerizing with the alkyl methacrylate (b-1), the aromatic vinyl monomer (b-2) and the vinyl cyanide monomer (b-3);
   a graft copolymer (B) having an average particle diameter of 0.05 to 0.13 $\mu$m, prepared by polymerizing 50 to 90% by weight of a solid matter of a rubber latex (a') having a glass transition temperature of at most 0° C., the rubber latex (a') being prepared by polymerizing 50 to 100% by weight of butadiene and/or alkyl acrylate (a'-1), 0 to 40% by weight of an aromatic vinyl monomer (a'-2), 0 to 10% by weight of a vinyl monomer (a'-3) capable of copolymerizing with the butadiene and/or alkyl acrylate (a'-1) and the aromatic vinyl monomer (a'-2), and 0 to 5% by weight of a polyfunctional monomer (a'-4), with 10 to 50% by weight of a monomer mixture (b') comprising 10 to 100% by weight of an alkyl methacrylate (b'-1), 0 to 90% by weight of an aromatic vinyl monomer (b'-2), 0 to 25% by weight of a vinyl cyanide monomer (b'-3) and 0 to 20% by weight of a vinyl monomer (b'-4) capable of copolymerizing with the alkyl methacrylate (b'-1), the aromatic vinyl monomer (b'-2) and the vinyl cyanide monomer (b'-3); and
   a vinyl chloride resin (C);
   wherein the proportion of the above graft copolymer (A) to the graft copolymer (B) (graft copolymer (A)/graft copolymer (B) (weight ratio)) is 50/50 to 95/5, and the proportion of the total amount of the above graft copolymer (A) and the graft copolymer (B) to the vinyl chloride resin (C) (total amount of graft copolymer (A) and graft copolymer (B)/vinyl chloride resin (C) (weight ratio)) is 1/99 to 30/70.

2. The vinyl chloride resin composition of claim 1, wherein the graft copolymer (B) is a graft copolymer prepared by polymerizing 60 to 90% by weight of a solid matter of a rubber latex (a') with 10 to 40% by weight of a monomer mixture (b').

3. The vinyl chloride resin composition of claim 1, from which is produced a molded material having a falling weight strength of at least 200 cm.

4. The vinyl chloride resin composition of claim 1, from which is produced a molded material having a Charpy strength of at least 80 kg(cm/cm$^2$).

5. The vinyl chloride resin composition of claim 1, from which is produced a molded material having a falling weight strength of at least 200 cm and a Charpy strength of at least 80 kg (cm/cm$^2$).

* * * * *